(12) United States Patent
Hong et al.

(10) Patent No.: US 7,630,416 B2
(45) Date of Patent: Dec. 8, 2009

(54) HIGH-REPETITION-RATE FEMTOSECOND REGENERATIVE AMPLIFICATION SYSTEM

(75) Inventors: Kyung Han Hong, Gwangju (KR); Tae Jun Yu, Gwangju (KR); Do Kyeong Ko, Gwangju (KR); Jong Min Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 308 days.

(21) Appl. No.: 11/425,840

(22) Filed: Jun. 22, 2006

(65) Prior Publication Data

US 2007/0098025 A1    May 3, 2007

(30) Foreign Application Priority Data

Nov. 3, 2005    (KR)    .................... 10-2005-0105068

(51) Int. Cl.
*H01S 3/117* (2006.01)
(52) U.S. Cl. .......................................... 372/13; 372/25
(58) Field of Classification Search .................. 372/13, 372/25
See application file for complete search history.

(56) References Cited

U.S. PATENT DOCUMENTS

| 5,696,782 | A | 12/1997 | Harter et al. | |
|---|---|---|---|---|
| 6,272,156 | B1 | 8/2001 | Reed et al. | |
| 6,303,901 | B1 | 10/2001 | Perry et al. | |
| 6,363,090 | B1 | 3/2002 | Wintner et al. | |
| 6,388,799 | B1 * | 5/2002 | Arnone et al. | 359/326 |
| 6,621,040 | B1 * | 9/2003 | Perry et al. | 219/121.67 |
| 6,760,356 | B2 * | 7/2004 | Erbert et al. | 372/93 |
| 2004/0000942 | A1 * | 1/2004 | Kapteyn et al. | 327/306 |

FOREIGN PATENT DOCUMENTS

| JP | 9105964 A | 4/1997 |
|---|---|---|
| JP | 11289120 A | 10/1999 |
| JP | 2000214506 A | 8/2000 |
| JP | 2000349380 A | 12/2000 |

(Continued)

OTHER PUBLICATIONS

Linder et al., "Dispersion Control in a 100-kHz-Repetition-Rate 35-fs Ti:Sapphire Regenerative Amplifier System", Nov. 2002, IEEE, Journal of Quantum Electronics vol. 38, No. 11, 1465-1470.*

(Continued)

*Primary Examiner*—Minsun Harvey
*Assistant Examiner*—Joshua King
(74) *Attorney, Agent, or Firm*—Rothwell, Figg, Ernst & Manbeck PC

(57) ABSTRACT

Provided is a high-repetition-rate femtosecond regenerative amplification system. The regenerative amplification system includes: a laser oscillator emitting pulses; a stretcher stretching the pulses with negative dispersion; a regenerative amplifier amplifying the pulses, the regenerative amplifier comprising an acousto-optic modulator for pulse switching, a pulsed pump laser for pumping a gain medium, a resonator for reciprocating the pulses between a plurality of mirrors, and at least one chirped mirror for providing negative dispersion; and a glass compressor compressing the pulses. Accordingly, the 100 kHz-class high-repetition-rate femtosecond regenerative amplification system can produce an output energy of tens of µJ, higher than a few µJ provided by a conventional system.

8 Claims, 5 Drawing Sheets

FOREIGN PATENT DOCUMENTS

| | | |
|---|---|---|
| JP | 2002502061 A | 1/2002 |
| JP | 2002511801 A | 4/2002 |
| JP | 2004085358 A | 3/2004 |
| WO | WO 2003096495 A1 * | 11/2003 |
| WO | WO 2004068651 A2 * | 8/2004 |
| WO | WO 2004068657 A1 * | 8/2004 |

OTHER PUBLICATIONS

Kartner et al. "Design and fabrication of double-chirped mirrors," Optics Letters, 22(11):831-833 (1997).

* cited by examiner

HIGH-REPETITION-RATE FEMTOSECOND REGENERATIVE AMPLIFICATION SYSTEM

CROSS-REFERENCE TO RELATED PATENT APPLICATION

This application claims the benefit of Korean Patent Application No. 10-2005-0105068, filed on Nov. 3, 2005, in the Korean Intellectual Property Office, the disclosure of which is incorporated herein in its entirety by reference.

BACKGROUND OF THE INVENTION

1. Field of the Invention

The present invention relates to a high-repetition-rate femtosecond regenerative amplification system, and more particularly, to a femtosecond regenerative amplification system which can amplify pulses at a high repetition rate of about 100 kHz and produce pulses of a high energy of tens of microjoules (μJ) and a gigawatt (GW) peak power.

2. Description of the Related Art

Lasers have found innumerable applications using their characteristics such as monochromaticity, directionality, and brightness. From the beginning, researches have sought to increase the peak power of their lasers through Q-switching, mode-locking, or amplification. However, this quest was blocked since high intensities were found to affect the optical properties of lasing materials and optical components. Ultra-short high-intensity lasers eliminating the intensity barrier have recently been developed by combining chirped pulse amplification (CPA) technology with ultra-short (picosecond or femtosecond) pulse technology. Such ultra-short high-intensity lasers are high power laser systems which can amplify ultra short pulses with a femtosecond or picosecond pulse width to provide terawatts or more of power. The femtosecond laser technology based on Ti:sapphire gain medium has make it possible to produce pulses having pulse durations of 5 femtoseconds or peak powers of petawatts ($PW=10^{15}$ W).

In particular, since the femtosecond laser technology can obtain a high peak power with a low energy, thermal damage can be reduced and amplification can be acquired at a high repetition rate of 1 kHz or more. FIG. 1 is a graph illustrating a relationship between peak power and repetition rate in femtosecond lasers using titanium sapphire (Ti:S) amplifiers. When lasers have a repetition rate of about 10 Hz, the lasers generally have peak powers of a few terawatts (TW) to tens of terawatts. If lasers have a repetition rate of 1 Hz or less, they can have peak powers of petawatts (PW). When lasers have a repetition rate of about 1 to 10 kHz, the lasers generally have peak powers of sub-terawatts (sub-TW) corresponding to approximately 0.1 to 0.5 TW, but can have peak powers of terawatts (TW) as well. When lasers have a high repetition rate of 100 to 250 kHz, the lasers generally have peak powers of tens of megawatts (MW), but can have peak powers of sub-gigawatts (sub-GW) less than 0.2 GW as well.

When the repetition rate increases to kHz, a necessary pump laser energy decreases, which is advantageous to the manufacturing of compact femtosecond lasers. Since the lasers have a high working rate, they can be used in X-ray generation experiments as well as industrial applications such as micro-machining and glass cutting. However, compared to 1 to 10 kHz femtosecond lasers, 100 kHz lasers have a very low output power. As a result, commercial lasers of ~100 kHz repetition rate have not been frequently used so far. A pulse switching method, a pump source, and an output energy according to a laser repetition rate are shown in the following table. Here, the output energy is obtained when a single stage amplifier is used.

TABLE 1

| Repetition rate | Pulse switching method | Pump source | Output energy |
| --- | --- | --- | --- |
| 10 Hz | Electro-optic modulation | 10 ns Q-switched green laser (Nd:YAG) | ~10 mJ |
| 1–20 kHz | Electro-optic modulation | 100–300 ns Q-switched green laser (Nd:YLF) | ~1 mJ |
| 100–250 kHz | Acousto-optic modulation | Continuous wave (CW) green laser ($Nd:YVO_4$, Argon) | ~1 μJ |

In Table 1, lasers having a 100-250 kHz repetition rate generally deliver an output energy of 1 μJ or so, and the highest output energy to date at a 100 kHz repetition rate is 7 μJ.

FIG. 2 is a block diagram of a conventional 100 kHz laser system. The conventional 100 kHz laser system includes a Ti:S oscillator 10, a Ti:S regenerative amplifier 20, and a compressor 30. A CW argon laser 13 pumps the oscillator 10 and the regenerative amplifier 20. A part of a beam output from the CW argon laser 13 and separated by a first beam splitter 15 travels toward the regenerative amplifier 20, and the rest of the beam is reflected by a reflective mirror 17 to the oscillator 10. For example, the oscillator 10 outputs 100 pJ, 75 femtosecond laser pulses, the regenerative amplifier 20 amplifies the laser beams and outputs 1.87 μJ, 10 picosecond pulses, and the compressor 30 compresses the pulses and outputs 1 μJ, 130 femtosecond pulses.

FIG. 3A is a plan view of the regenerative amplifier 20 used in the conventional 100 kHz laser system of FIG. 2. Referring to FIG. 3A, pulses output from the oscillator 10 pass through a polarizing beam splitter 41, a Faraday rotator 43, a half wave plate 45, and a reflective mirror 47 and then are input to the regenerative amplifier 20. The regenerative amplifier 20 includes a resonator 21 for resonating pulses, an acousto-optic modulator 22 using a Bragg cell called a resonator dumper for switching, a Ti:S gain medium 23, and a Q-switch 24. The Q-switch 24 is separately provided from a laser pulse resonance switch when a CW laser is used as a pump source.

The resonator 21 includes a plurality of curvature mirrors CM1, CM2, CM3, and CM4, such that the pulses output from the oscillator 10 are amplified while repeatedly reciprocating between the reflective mirrors. Here, the pulses are naturally stretched due to positive dispersion whenever the pulses pass through the Ti:S gain medium 23 or the acousto-optic modulator 22 using the Bragg cell. The stretched and amplified pulses are compressed by the compressor 30 to reduce a pulse width and increase a peak power.

FIG. 3B is a plan view of the compressor 30 used in the conventional 100 kHz laser system of FIG. 2. Referring to FIG. 3B, the compressor 30 includes first and second prism sets 32 and 34 each including a plurality of prisms. A planar mirror 31 extracts a beam by being moved up and down.

Since the conventional laser system constructed as shown in FIGS. 3A and 3B uses the CW laser as the pump source, the conventional laser system has a weak pump intensity, thereby lowering an amplified energy. Also, the conventional laser system requires the Q-switch 24 in addition to the modulator 22 in the regenerative amplifier 20, thereby increasing the number of components. Further, the compressor 30 includes the plurality of prisms and distances between the prisms are wide, thereby increasing the size of the conventional laser system. Furthermore, remaining high order dispersion degrades a compression ratio, thereby making it difficult to produce short pulses less than 100 femtoseconds.

On the other side, the conventional 100 kHz laser can efficiently amplify laser pulses using a CPA scheme that stretches and amplifies pulses and then compresses the amplified pulses. FIG. 4 illustrates pulses stretched, amplified, and compressed by a CPA scheme used in the conventional laser system of FIG. 2. Referring to FIG. 4(a), pulses are output from the oscillator 10. Referring to FIG. 4(b), the pulses are provided with positive dispersion by a pulse stretcher including a pair of diffraction gratings to be stretched to tens of picoseconds. At this time, the stretched pulses are positively chirped from low to high frequency such that the frequency of a front end of the stretched pulses is less than the frequency of a rear end of the stretched pulses. Referring to FIG. 4(c), the stretched pulses are amplified by the amplifier 20. Referring to FIG. 4(d), the amplified pulses are compressed by the compressor 30. In the typical CPA scheme, the diffraction gratings are used in both pulse stretching and compression modes. In detail, during the pulse stretching mode, the diffraction gratings are arranged to provide positive dispersion, and during the pulse compression mode, the prisms and the diffraction gratings are arranged to provide negative dispersion. The CPA scheme can reduce the pulse width through effective dispersion compensation. However, the CPA scheme has disadvantages in that because the pluses pass four times through the diffraction gratings during the pulse compression mode, compression efficiency is lowered to 60% or less. Since the 100-kHz CPA laser still uses the CW laser as a pump laser, the output energy is still low, too.

SUMMARY OF THE INVENTION

The present invention provides a 100-kHz-class high-repetition-rate femtosecond regenerative amplification system that can emit pulses with a high output energy.

According to an aspect of the present invention, there is provided a high-repetition-rate femtosecond regenerative amplification system comprising: a laser oscillator emitting pulses; a stretcher stretching the pulses; a regenerative amplifier amplifying the pulses, the regenerative amplifier comprising an acousto-optic modulator for pulse switching, a pulsed pump laser for pumping a gain medium, a resonator for reciprocating the pulses between a plurality of mirrors, and at least one chirped mirror for providing negative dispersion; and a compressor compressing the pulses.

The pump laser may be a high-repetition-rate pulsed green laser.

The pump laser may be a frequency-doubled Nd:YAG, Nd:YVO$_4$, Yb:YAG laser.

The laser oscillator may be a titanium sapphire (Ti:S) femtosecond laser, or a laser that can generate femtosecond pulses in a wavelength range of 650-1100 nm of a Ti:S gain medium.

The gain medium may be a Ti:S gain medium.

The at least one chirped mirror may compensate for dispersion in the resonator.

The stretcher may stretch the pulses by providing negative dispersion to the pulses.

The regenerative amplifier may have a repetition rate of 20 to 200 kHz.

The pulses may be output from the compressor at a repetition rate less than 100 kHz with an energy of 20 μJ or more per pulse.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
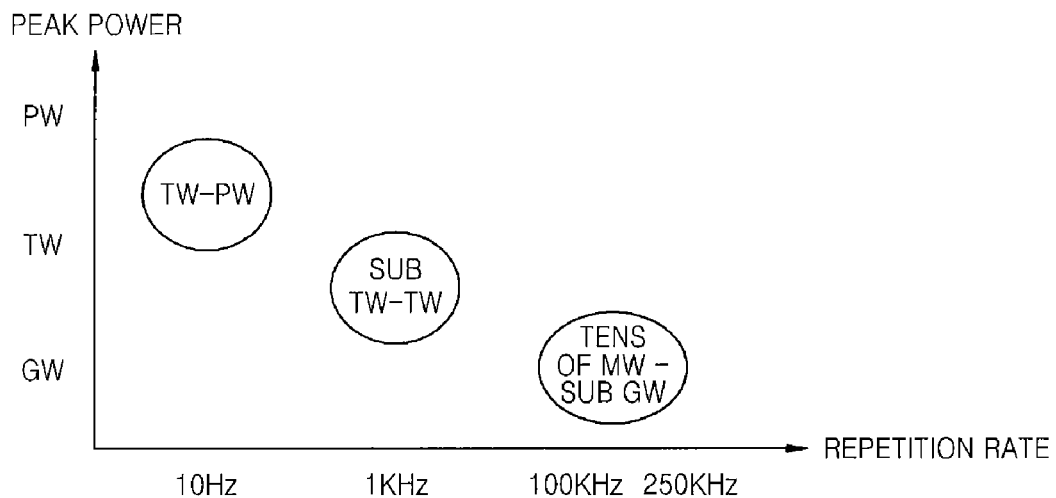
FIG. 1 is a graph illustrating a relationship between peak power and repetition rate in femtosecond lasers using titanium sapphire (Ti:S) amplifiers.
Figure 2:
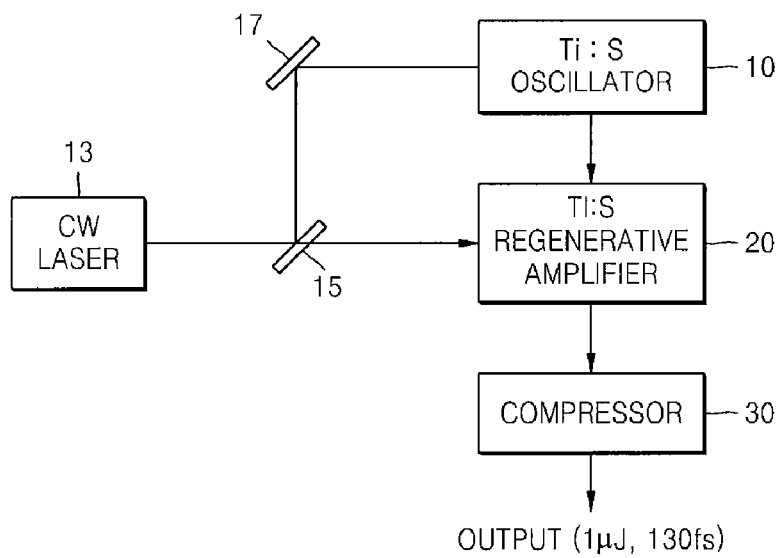
FIG. 2 is a block diagram of a conventional 100 kHz high-repetition-rate femtosecond regenerative amplification system.
Figure 3A:
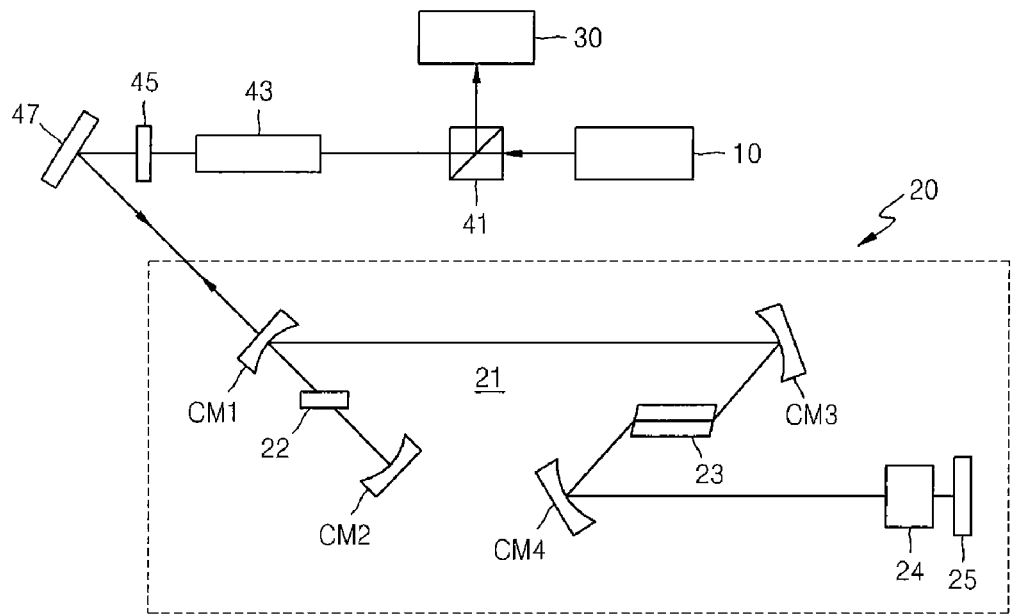
FIG. 3A is a plan view of a regenerative amplifier used in the conventional 100 kHz high-repetition-rate femtosecond regenerative amplification system of FIG. 2.
Figure 3B:
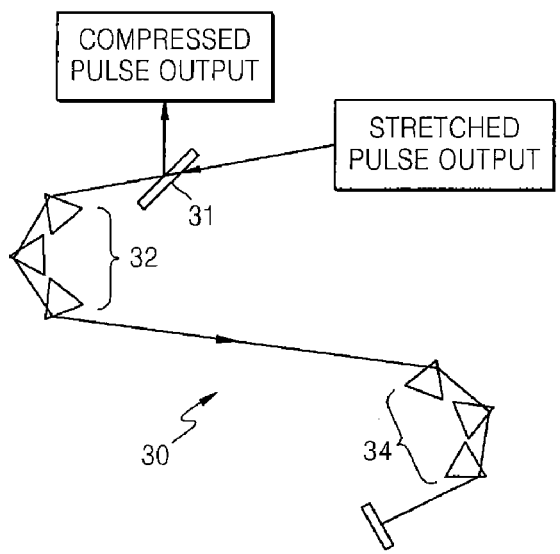
FIG. 3B is a plan view of a compressor used in the conventional 100 kHz high-repetition-rate femtosecond regenerative amplification system of FIG. 2.
Figure 4:
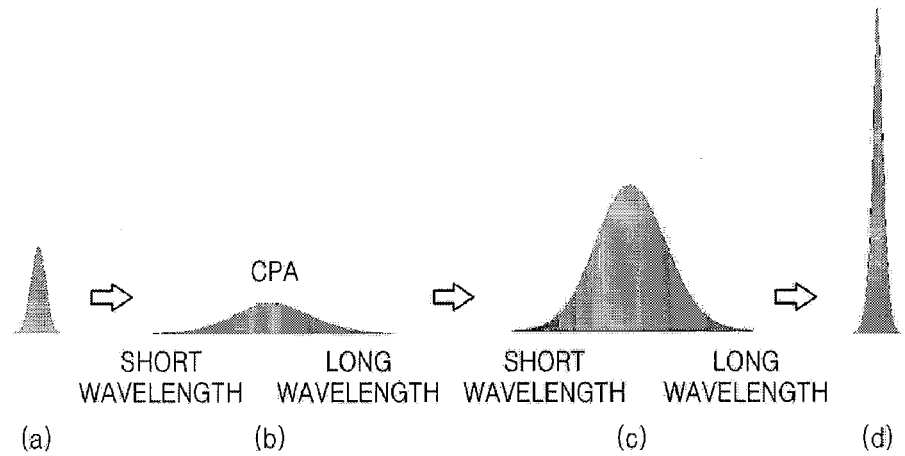
FIG. 4 illustrates pulses stretched and compressed by a chirped pulse amplification (CPA) scheme used in the conventional 100 kHz high-repetition-rate femtosecond regenerative amplification system of FIG. 2 based on a TI:S laser.
Figure 5:
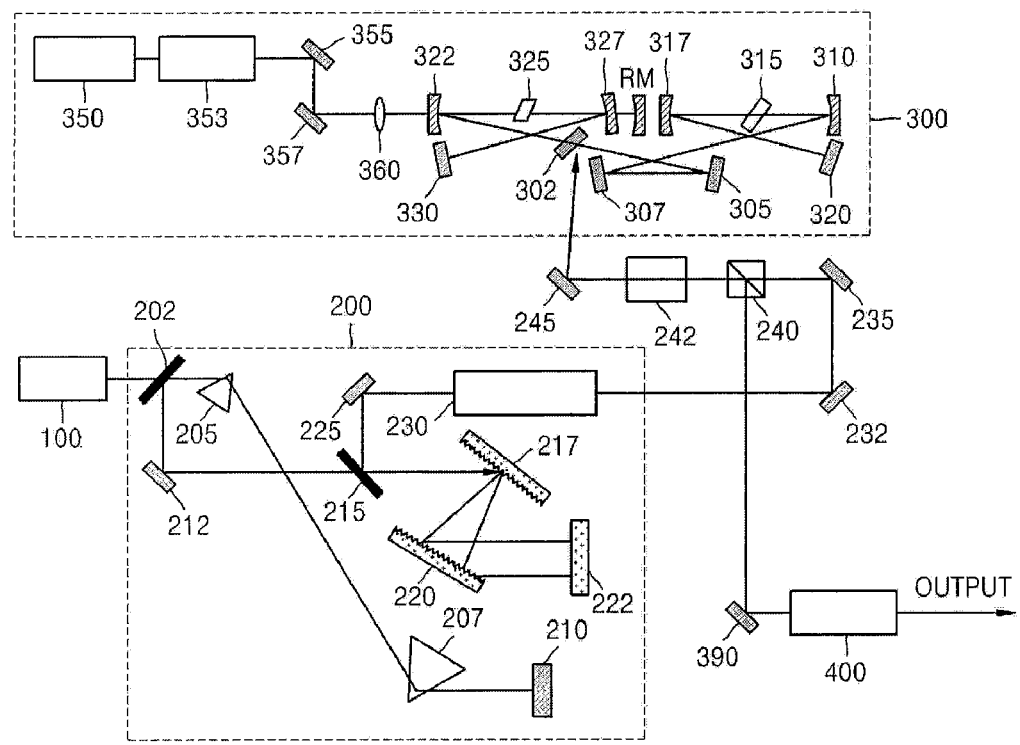
FIG. 5 is a plan view of a high-repetition-rate femtosecond regenerative amplification system according to an embodiment of the present invention.

FIG. 5 is a plan view of a high-repetition-rate femtosecond regenerative amplification system according to an embodiment of the present invention. Referring to FIG. 5, the regenerative amplification system includes an oscillator 100 outputting laser pulses, a stretcher 200 stretching the output pulses, an amplifier 300 amplifying the stretched pulses, and a compressor 400 compressing the amplified pulses.

Figure 6:
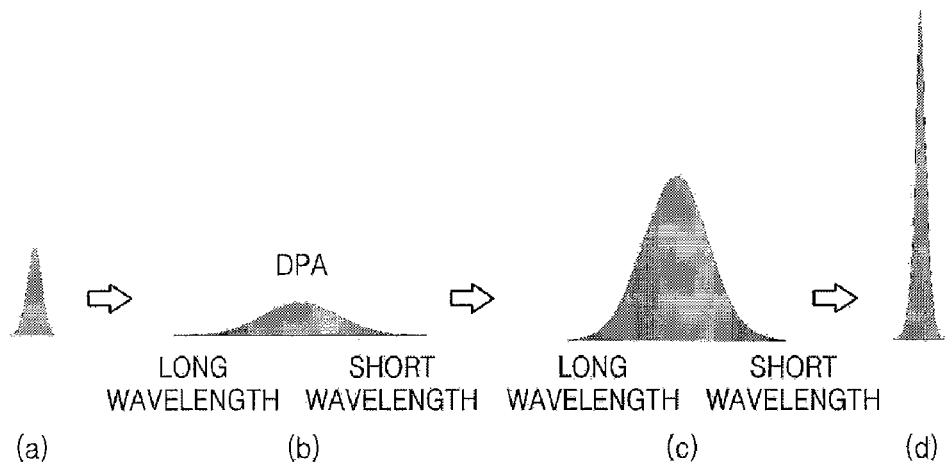
FIG. 6 illustrates pulses stretched and compressed by a downchirped pulse amplification (DPA) scheme used in the high-repetition-rate femtosecond regenerative amplification system of FIG. 5.

The oscillator 100 may be an ultra-short pulse laser, such as titanium sapphire (Ti:S) femtosecond laser, or a fiber laser that can generate femtosecond pulses in a wavelength range of 650-1100 nm of a Ti:S gain medium. The oscillator 100 outputs pulses to the stretcher 200. The stretcher 200 includes at least one prism, and a pair of diffraction gratings 217 and 220, and stretches the pulses to tens of picoseconds by providing negative dispersion to the pulses. Referring FIG. 6(a), ultra-short pulses are output from the oscillator 100. Referring to FIG. 6(b), the ultra-short pulses are provided with negative dispersion by the stretcher 200 to be stretched over short and long wavelengths by a downchirped pulse amplification (DPA) scheme such that the frequency of a front end of the stretched pulses is greater than the frequency of a rear end of the stretched pulses.

The stretcher 200 includes first and second prisms 205 and 207 for providing negative dispersion to the pulses incident from the oscillator 100, and a first mirror 210 for reflecting the pulses passing through the second prism 207 back to the second prism 207. The first mirror 210 downwardly reflects the pulses so that the pulses reflected by the first mirror 210 are lower than the pulses incident from second prism 207. The pulses reflected by the first mirror 210 downwardly travels toward a first pickup mirror 202 and the path of the pulses is changed by the first pickup mirror 202. The pulses are reflected by the first pickup mirror 202 to the first diffraction grating 217. The first diffraction grating 217 is parallel to the second diffraction grating 220. The first and second diffraction gratings 217 and 220 are reflective such that the pulses reciprocate between the first and second diffraction gratings 217 and 220. The pulses reflected by the second diffraction grating 220 are downwardly reflected by a third mirror 222 back to the second diffraction grating 220, such that the pulses incident from the second diffraction grating 220 are higher than the pulses reflected by the third mirror 222.

A second pickup mirror 215 is disposed between the second mirror 212 and the first diffraction grating 217. The pulses reflected by the second diffraction grating 220 and the first diffraction grating 217 are reflected downwardly by the second pickup mirror 215 to the regenerative amplifier 300. A fourth mirror 225 may be disposed between the second pickup mirror 215 and the regenerative amplifier 300.

The second mirror 212 and the fourth mirror 225 may be selectively provided to adjust the configuration of the stretcher 200 or the pulse path length, and more mirrors may be used. A first telescope 230 adjusts the cross-section of a beam to match with a resonator mode of the regenerative amplifier 300.

The pulses output from the stretcher 200 are amplified by the regenerative amplifier 300 at a high repetition rate of about 100 kHz. The regenerative amplifier 300 includes an acousto-optic modulator 315, that is, a Bragg cell, for pulse switching, a gain medium 325, and a pump laser 350. The gain medium 325 may be a Ti:S gain medium, and the pump laser 350 may be a high-repetition-rate pulsed green laser such as a frequency-doubled Nd:YAG, Nd:YVO$_4$, Yb:YAG laser. Here, frequency-doubling is a process of generating pulses with half an original wavelength using a second harmonic crystal. For example, the frequency-doubled laser may allow a wavelength of 1064 nm to be converted to a wavelength of 532 nm. Since the pulsed laser 350 is used as the pump source, a Q-switch which is required by an existing continuous wave (CW) laser is unnecessary. The repetition rate of the regenerative amplifier 300 can range from a single shot to MHz, and is limited only by the repetition rate of the pump laser 350. In view of pump laser technology for amplifying the high-repetition rate Ti:S laser such as the Nd:YAG laser, the Nd:YVO$_4$ laser, or the Yb:YAG laser up to date, the repetition rate of the regenerative amplifier 300 can range from 1 to 200 kHz, and particularly can be used in the range from 20 to 200 kHz where an electro-optic modulator for the existing Ti:S laser cannot operate. As the repetition rate exceeds 200 kHz to be close to 300 kHz, the amplification limit of the Ti:S gain medium 325, the pulsed laser may become inferior to the existing CW laser.

Also, the regenerative amplifier 300 includes a resonator having a plurality of mirrors, and at least one chirped mirror that compensates for positive dispersion in the resonator. The chirped mirror is a dielectric mirror including a stack of dielectric layers with increasing thickness, which is used to provide negative dispersion during reflection. Since the chirped mirror can act as a highly reflective mirror, all the mirrors of the resonator may be chirped mirrors. The resonator amplifies the pulses incident from the stretcher 200 using a resonant cavity comprised of the plurality of mirrors. FIG. 5 illustrates that the resonator includes a fifth mirror 310, a sixth mirror 317, a seventh mirror 322, and an eighth mirror 327.

Since the chirped mirror compensates for positive dispersion produced by the materials of the resonator by providing negative dispersion to the pulses, the width of the pulses output from the regenerative amplifier 300 can be similar to that of the stretched pulses irrespective of the number of roundtrips of the regenerative amplifier 300. If the chirped mirror is not used, the pulse width is reduced due to the positive dispersion while the pulses reciprocate in the regenerative amplifier 300, thereby damaging the Bragg cell 315 or the Ti:S gain medium 325 during amplication. Accordingly, the chirped mirror can prevent damage to the Bragg cell 315 or the Ti:S gain medium 325 during amplification by providing negative dispersion to the pulses, thereby increasing an amplification factor.

Even though the number of roundtrips in the regenerative amplifier 300 is changed, the pulse width is not changed, thereby making unnecessary to change conditions during pulse compression. Accordingly, the amplification system can easily compensate for dispersion irrespective of the amplification conditions of the regenerative amplifier 300. FIG. 5 illustrates that the at least one chirped mirror includes first through fourth chirped mirrors 305, 307, 320, and 330. Referring to FIG. 6(c), the pulses are amplified by the regenerative amplifier 300. Second, third, and fourth order dispersions are shown in the following table when the pulse stretcher 200, the regenerative amplifier 300, and the pulse compressor 400 are used to compress the pulses to 50 femtoseconds or less.

TABLE 2

| Optical elements | Function | Second order dispersion (fs$^2$) | Third order dispersion (fs$^3$) | Fourth order dispersion (fs$^4$) |
|---|---|---|---|---|
| One pair of fused silica prisms (separation of 1380 mm between prisms, two roundtrips) | Pulse stretcher | −19100 | −103100 | −193000 |
| One pair of diffraction gratings (number of gratings: 600 gr/mm, 70°, separation of 58 mm between diffraction gratings) | Pulse stretcher | −47900 | 49700 | −75000 |
| Compressor (SF10 optical | Pulse | 58600 | 37200 | 10000 |

TABLE 2-continued

| Optical elements | Function | Second order dispersion ($fs^2$) | Third order dispersion ($fs^3$) | Fourth order dispersion ($fs^4$) |
|---|---|---|---|---|
| glass with length of 368 mm) Other materials (Bragg cell, Faraday rotator, Ti:S, polarizing beam splitter, chirped mirror) | compressor Pulse amplifier | 8400 | 16200 | −5000 |
| Total | | 0 | 0 | −263000 |

Referring to Table 2, when the stretcher 200 includes the prisms and the diffraction gratings and the pulse compressor 400 is formed of optical glass, the amplification system can compensate for third order dispersion as well as second order dispersion. Fourth order dispersion negligibly affects the pulse width, compared to the second and the third order terms. To obtain a pulse width less than 50 femtoseconds, in addition to the dispersion compensation, laser pulses with a spectrum broad enough to obtain the pulse width of 50 femtoseconds or less must be incident on the regenerative amplifier 300. For example, pulses with a Gaussian spectrum of a full width half maximum of about 40 nm centered around 800 nm must be incident on the regenerative amplifier 300.

In detail, the regenerative amplifier 300 includes a pickup mirror 302 for picking up the pulses output from the stretcher 200, the first and second chirped mirrors 305 and 307 for providing negative dispersion to the pulses incident from the pickup mirror 302, the fifth and sixth mirrors 310 and 317 for sequentially reflecting the pulses incident from the second chirped mirror 307, and the third chirped mirror 320 for reflecting the pulses reflected by the sixth mirror 317 back to the sixth mirror 317 and providing negative dispersion. The pulses reflected by the third chirped mirror 320 inversely travel to pass through the sixth mirror 317, the fifth mirror 310, the second chirped mirror 307, and the first chirped mirror 305 and be incident on the seventh mirror 322. The pulses reflected by the seventh mirror 322 pass through the gain medium 325 to be incident on the eight mirror 327. The fifth through eighth mirrors 310, 317, 322, and 327 are focusing mirrors, and the seventh and eighth mirrors 322 and 327 among them are applied with dichroic coating to transmit a pump beam and reflect an amplified beam. The gain medium 325 is pumped and oscillated by the pump laser 350. The oscillated pulses are amplified while reciprocating several times in the resonator, and when the pulses reach gain saturation, the pulses are output from the regenerative amplifier 300 through the acousto-optic modulator 315.

A second telescope 353, first and second reflective mirrors 355 and 357, and a lens 360 may be further disposed between the pump laser 350 and the seventh mirror 322. The second telescope 353 and the lens 360 adjust the size of the pump beam at the Ti:S gain medium 325. Also, mirrors 232, 235, and 245 for reflecting pulses, a polarizing beam splitter 240 for reflecting or transmitting the pulses according to their polarization directions, and a Faraday isolator 242 are disposed between the stretcher 200 and the regenerative amplifier 300. A refocusing mirror RM may be disposed behind the eighth mirror 327 to increase the absorption rate of the pump beam by refocusing the pulses output from the pump laser 350.

The polarizing beam splitter 240 sends the pulses output from the stretcher 200 to the regenerative amplifier 300, and the pulses, which have been amplified by the regenerative amplifier 300 and reflected by the Faraday isolator 242 to have changed polarization directions, to the compressor 400. A mirror 390 for reflecting the pulses output from the polarizing beam splitter 240 may be further provided.

The compressor 400 may include an optical glass block. The compressor 400 compresses the pulses stretched with negative dispersion by the stretcher 200 by providing positive dispersion to the pulses. Since the compressor 400 has high compression efficiency and simple structure, the pulse width is less sensitive to the pulse path change.

Parameters used in an amplification experiment on the regenerative amplification system of FIG. 5 are shown in the following table.

TABLE 3

| Parameters | Conditions |
|---|---|
| Pump energy | 1.1 J/cm² (200 µJ pump energy at 100 kHz) |
| Size of beam at gain medium | Diameter of 150 µm |
| Number of roundtrips | 30 (calculation) 30–33 (experiment) |
| Output energy | 33 µJ (calculation with 60% dumping efficiency) 30 µJ (experiment) |

Figure 7:
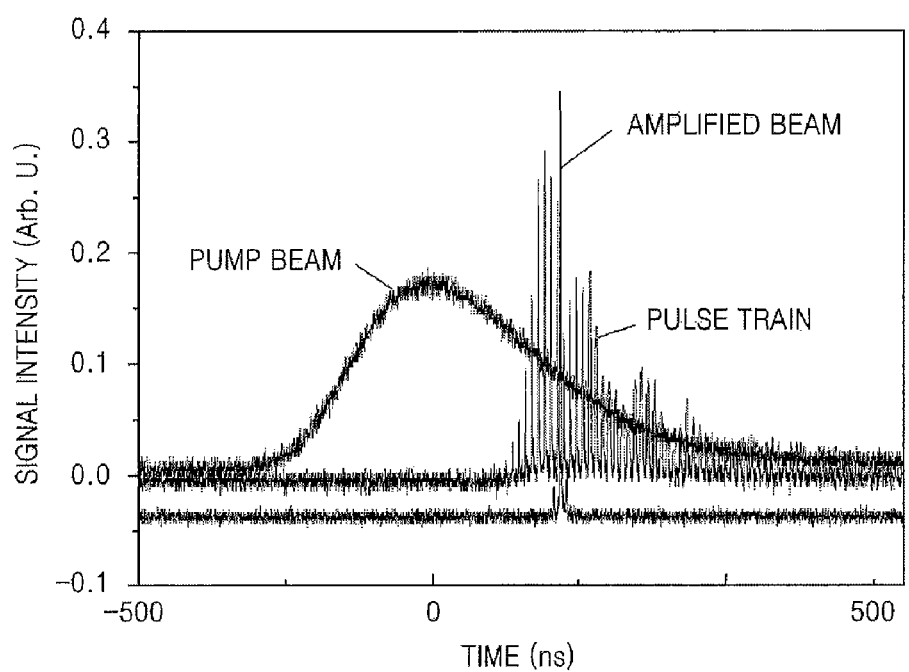
FIG. 7 is a graph illustrating a relationship between signal intensity and time for a pump beam, a pulse train, and an amplified beam in the high-repetition-rate femtosecond regenerative amplification system of FIG. 5.
Figure 8:
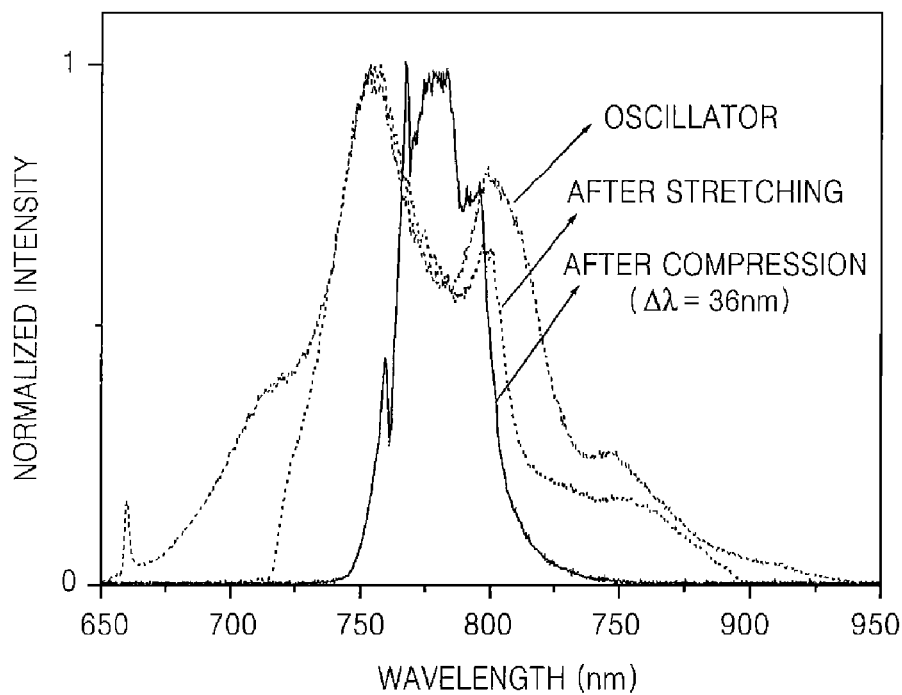
FIG. 8 is a graph illustrating a relationship between normalized intensity and wavelength for pulses output from an oscillator, stretched pulses, and compressed pulses in the high-repetition-rate femtosecond regenerative amplification system of FIG. 5.

FIG. 7 is a graph illustrating a timing relationship between signal intensity and time for a pump beam, a pulse train, and an amplified beam sequentially generated in the regenerative amplifier 300 of the high-repetition-rate femtosecond regenerative amplification system of FIG. 5. FIG. 8 is a graph illustrating a relationship between normalized intensity and wavelength for pulses output from the oscillator 100, stretched pulses, and compressed pulses in the high-repetition-rate femtosecond regenerative amplification system of FIG. 5. Referring to FIGS. 7 and 8, the pulses are amplified and the spectrum width is reduced in the same manner as by a general amplifier. Also, it can be seen that the pulses are amplified to have a wide spectrum width of approximately 36 nm at a center wavelength of 780 nm. The pulses can be compressed up to 20 fs in duration from the spectrum width. Accordingly, the regenerative amplification system of the present embodiment can obtain an amplified energy of 30 µJ with a pulsed pump energy of 200 µJ, and a compressed energy of 28 µJ with 95% compression efficiency.

Figure 9:
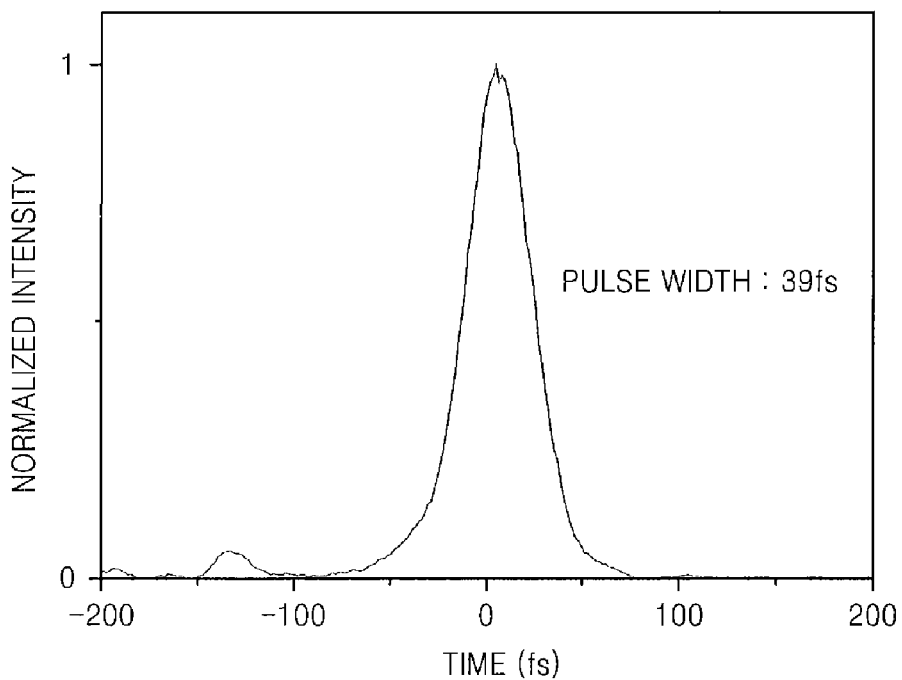
FIG. 9 is a graph illustrating a relationship between normalized intensity and time for pulses compressed in the high-repetition-rate femtosecond regenerative amplification system of FIG. 5.

FIG. 9 is a graph illustrating a relationship between normalized intensity and time for the pulses output and compressed in the high-repetition-rate femtosecond regenerative amplification system of FIG. 5. A frequency-resolved optical gating technique was used to characterize laser pulses in time. It can be seen that the pulses are compressed to 39 fs. Accordingly, the regenerative amplification system of the present embodiment can generate pulses having a peak power of 0.7 GW (28 µJ/39 fs), which is the highest ever produced in the field, at a repetition rate of 100 kHz level. Accordingly, the 20-100 kHz high-repetition-rate femtosecond Ti:S regenerative amplification system of the present embodiment can effectively improve energy efficiency.

As described above, since the regenerative amplification system according to the present embodiment compensates for positive dispersion in the regenerative amplifier 300 by employing at least one chirped mirror in the regenerative amplifier 300, the pulse width is not changed due to the dispersion during amplification. Accordingly, optical damage caused when the pulse width is reduced can be prevented, and factors of the pulse stretcher 200 and the compressor 400 can be maintained irrespective of the number of roundtrips in the regenerative amplifier 300, thereby optimally compressing the pulses in an easy manner. In addition, a wider spectrum width can be obtained when all the mirrors in the regenerative amplifier 300 are chirped mirrors instead of general dielectric coating mirrors.

Also, since the pulsed pump laser 350 is used instead of the CW pump laser, a pump energy per pulse is substantially increased despite the same average power at a repetition rate of 100 kHz level. Since the Ti:S gain medium 325 has a fluorescence lifetime of 3.2 μs, spontaneous emission increases as a repetition rate is reduced from approximately 300 kHz, thereby making the CW laser disadvantageous in energy efficiency. Accordingly, at a repetition rate of 20-200 kHz which is mainly used by the regenerative amplifier 300 of the present embodiment, the pulsed pump laser 350 is superior to the CW laser. Hence, the regenerative amplification system of the present embodiment can increase an amplified energy and can be widely used. Further, since a separate Q-switch is not required in addition to the pulsed pump laser 350, the structure of the regenerative amplifier 300 can be simplified.

Moreover, since the pulses are stretched and compressed using the DPA scheme, the pulse compressor 400 can be simplified and easier optical alignment can be allowed. Since the pulse width is less sensitive to the compressor alignment, the pulse width stability can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A high-repetition-rate femtosecond Ti:sapphire regenerative amplification system comprising:
a laser oscillator emitting pulses;
a stretcher stretching the pulses by providing negative dispersion to the pulses using a downchirped pulse amplification scheme;
a regenerative amplifier amplifying the pulses, the regenerative amplifier comprising an acousto-optic modulator for pulse switching at the repetition rate of 20-200 kHz, a pulsed green pump laser for pumping a gain medium at the repetition rate of 20-200 kHz, a resonator for reciprocating the pulses between a plurality of mirrors, and at least one broadband chirped mirror for providing negative dispersion to prevent the pulse from being shortened during the amplification; and
a compressor compressing the pulses with the compression efficiency of higher than 90%.

2. The high-repetition-rate femtosecond regenerative amplification system of claim 1, wherein the pump laser is a frequency-doubled Nd:YAG laser in the range of 20-50 kHz, Nd:YVO$_4$ or Yb:YAG laser in the range of 50-200 kHz.

3. The high-repetition-rate femtosecond regenerative amplification system of claim 1, wherein the laser oscillator is a titanium sapphire (Ti:S) femtosecond laser, or a laser that can generate femtosecond pulses in a wavelength range of 650-1100 nm of a Ti:S gain medium.

4. The high-repetition-rate femtosecond regenerative amplification system of claim 1, wherein the stretcher includes a pair of prisms and a pair of facing diffraction gratings.

5. The high-repetition-rate femtosecond regenerative amplification system of claim 1, wherein the compressor includes an optical glass block.

6. The high-repetition-rate femtosecond regenerative amplification system of claim 1, wherein the pulses are compressed by compensating for second and third order dispersions using the stretcher and the compressor.

7. The high-repetition-rate femtosecond regenerative amplification system of claim 6, wherein the pulses compressed by the compressor have minimum pulse width of 50 femtoseconds or less, and simultaneously the pulses are output from the compressor at a repetition rate less than 100 kHz and higher than 50 kHz with an energy of 20 μJ or more pulse.

8. The high-repetition-rate femtosecond regenerative amplification system of claim 1, wherein the pulses compressed by the compressor have minimum pulse width of 50 femtoseconds or less.

* * * * *